United States Patent
Suzuki

(10) Patent No.: US 11,383,711 B2
(45) Date of Patent: Jul. 12, 2022

(54) TURNING CONTROL DEVICE

(71) Applicant: DENSO CORPORATION, Kariya (JP)

(72) Inventor: Takashi Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 288 days.

(21) Appl. No.: 16/545,633

(22) Filed: Aug. 20, 2019

(65) Prior Publication Data
US 2020/0070833 A1 Mar. 5, 2020

(30) Foreign Application Priority Data
Aug. 28, 2018 (JP) .............................. JP2018-159027

(51) Int. Cl.
| | |
|---|---|
| *B60W 30/18* | (2012.01) |
| *B60W 10/184* | (2012.01) |
| *B60W 10/20* | (2006.01) |
| *B62D 5/04* | (2006.01) |
| *B60T 8/17* | (2006.01) |

(52) U.S. Cl.
CPC ......... *B60W 30/18145* (2013.01); *B60T 8/17* (2013.01); *B60W 10/184* (2013.01); *B60W 10/20* (2013.01); *B62D 5/0463* (2013.01); *B60T 2201/16* (2013.01); *B60W 2400/00* (2013.01); *B60W 2540/18* (2013.01); *B60W 2710/18* (2013.01); *B60W 2710/20* (2013.01)

(58) Field of Classification Search
CPC .... B60T 2201/16; B60T 2260/02; B60T 8/17; B60T 8/1755; B60W 10/184; B60W 10/20; B60W 2400/00; B60W 2540/18; B60W 2710/18; B60W 2710/20; B60W 30/18145; B62D 11/24; B62D 5/0463; B62D 9/002
See application file for complete search history.

(56) References Cited

U.S. PATENT DOCUMENTS

| | | | | |
|---|---|---|---|---|
| 8,224,527 | B2 * | 7/2012 | Shinmura | B62D 9/002 701/41 |
| 2002/0117347 | A1 * | 8/2002 | Nishizaki | B60T 8/1755 180/403 |
| 2005/0205346 | A1 * | 9/2005 | Aizawa | B60W 10/20 180/446 |
| 2010/0222966 | A1 * | 9/2010 | Shinmura | B62D 9/002 701/41 |
| 2010/0228444 | A1 * | 9/2010 | Kojo | B60W 30/045 701/42 |

(Continued)

FOREIGN PATENT DOCUMENTS

| | | |
|---|---|---|
| JP | 10-100740 A | 4/1998 |
| JP | 2002-240732 A | 8/2002 |

(Continued)

*Primary Examiner* — Babar Sarwar
(74) *Attorney, Agent, or Firm* — Maschoff Brennan

(57) ABSTRACT

A turning control device is provided for use in a vehicle control system including a steer-by-wire system and a brake system. The turning control device is configured to calculate a braking force difference, which is a difference in braking force between the left and right tire wheels. The turning control device is further configured to perform a high turning control that provides the braking force difference to the left and right tire wheels to cause a smaller turning radius of the vehicle when a steering angle corresponding value is larger than a judgment threshold.

11 Claims, 15 Drawing Sheets

(56) References Cited

U.S. PATENT DOCUMENTS

| | | | | |
|---|---|---|---|---|
| 2010/0250083 | A1* | 9/2010 | Takahashi | B60T 8/1755 |
| | | | | 701/70 |
| 2012/0226417 | A1* | 9/2012 | Nishikawa | B60W 30/12 |
| | | | | 701/42 |
| 2014/0145498 | A1* | 5/2014 | Yamakado | B60W 30/02 |
| | | | | 303/3 |
| 2015/0094927 | A1* | 4/2015 | Takahashi | B60W 30/025 |
| | | | | 701/93 |
| 2016/0297439 | A1* | 10/2016 | Inoue | B60W 10/20 |
| 2016/0297478 | A1* | 10/2016 | Inoue | B60W 40/08 |
| 2017/0088174 | A1* | 3/2017 | Inoue | B60T 8/17557 |
| 2017/0334443 | A1* | 11/2017 | Niibe | B60T 7/042 |
| 2018/0079447 | A1 | 3/2018 | Yamashita et al. | |
| 2018/0086340 | A1* | 3/2018 | Nagatsuka | B60W 30/0953 |
| 2018/0297594 | A1* | 10/2018 | Takahashi | G05D 1/0246 |
| 2019/0054916 | A1* | 2/2019 | Akiyama | B62D 6/04 |

FOREIGN PATENT DOCUMENTS

| | | |
|---|---|---|
| JP | 2006-131023 A | 5/2006 |
| JP | 2006-347286 A | 12/2006 |
| JP | 2009-154598 A | 7/2009 |
| JP | 05125055 B2 | 1/2013 |
| JP | 05309556 B2 | 10/2013 |

* cited by examiner

TURNING CONTROL DEVICE

CROSS REFERENCE TO RELATED APPLICATIONS

This application is based on Japanese Patent Application No. 2018-159027 filed on Aug. 28, 2018, disclosure of which is incorporated herein by reference.

TECHNICAL FIELD

The present disclosure relates to a turning control device.

BACKGROUND

There is a vehicle control device for controlling vehicle steering. For example, the vehicle control device performs such control that when a driver performs a steering operation for tighter turning in an end contact state of a steering wheel, the vehicle control device adjusts distribution of driving forces and braking forces to left and right tire wheels to turn the vehicle with a small turning radius. In the above, the end contact state of the steering wheel is the state where the steering wheel is at a maximum angle.

Discussion on the above background art will be given below, which is not necessarily prior art.

In the above electric power steering device, when the steering wheel becomes the end contact state, steering torque of the steering wheel may increase drastically. Specifically, because the control is performed responsive to the driver's force applied to the steering wheel in a steering-wheel hard-to-move state, a vehicle turning state may be changed even though rotation of the steering wheel is absent. This may disadvantageously provide an uncomfortable feeling to the driver.

SUMMARY

The present disclosure provides a turning control device for use in a vehicle control system that includes a steer-by-wire system and a brake system. The steer-by-wire system is such a system where a steering member and a steered wheel are mechanically separated from each other. The steer-by-wire system includes: a turning device configured to generate torque for turning the steered wheel in accordance with a steering state of the steering member; and a reaction force device configured to apply a reaction force to the steering member. The brake system is capable of controlling braking forces of left and right tire wheels independently from each other.

The turning control device comprises one or more microcomputers configured to act as a braking difference calculation unit that calculates a braking force difference, which is a difference in braking force between the left and right tire wheels. The one or more microcomputers is further configured to perform a high turning control that provides the braking force difference to the left and right tire wheels to cause a smaller turning radius of the vehicle when a steering angle corresponding value is larger than a judgment threshold, wherein the steering angle corresponding value is a steering angle or an absolute value of a value convertible into the steering angle. With the above turning control device, it is possible to make the turning radius of the vehicle smaller than a turning radius realized by the turning device only.

BRIEF DESCRIPTION OF DRAWINGS

Objects, features and advantages of the present disclosure become more apparent from the following detailed description made with reference to the accompanying drawings, in which.

DETAILED DESCRIPTION

A turning control device according to embodiments will be described with reference to the accompanying drawings. In embodiments, like references are used to refer to like parts to avoid redundant description.

First Embodiment

Figure 1:
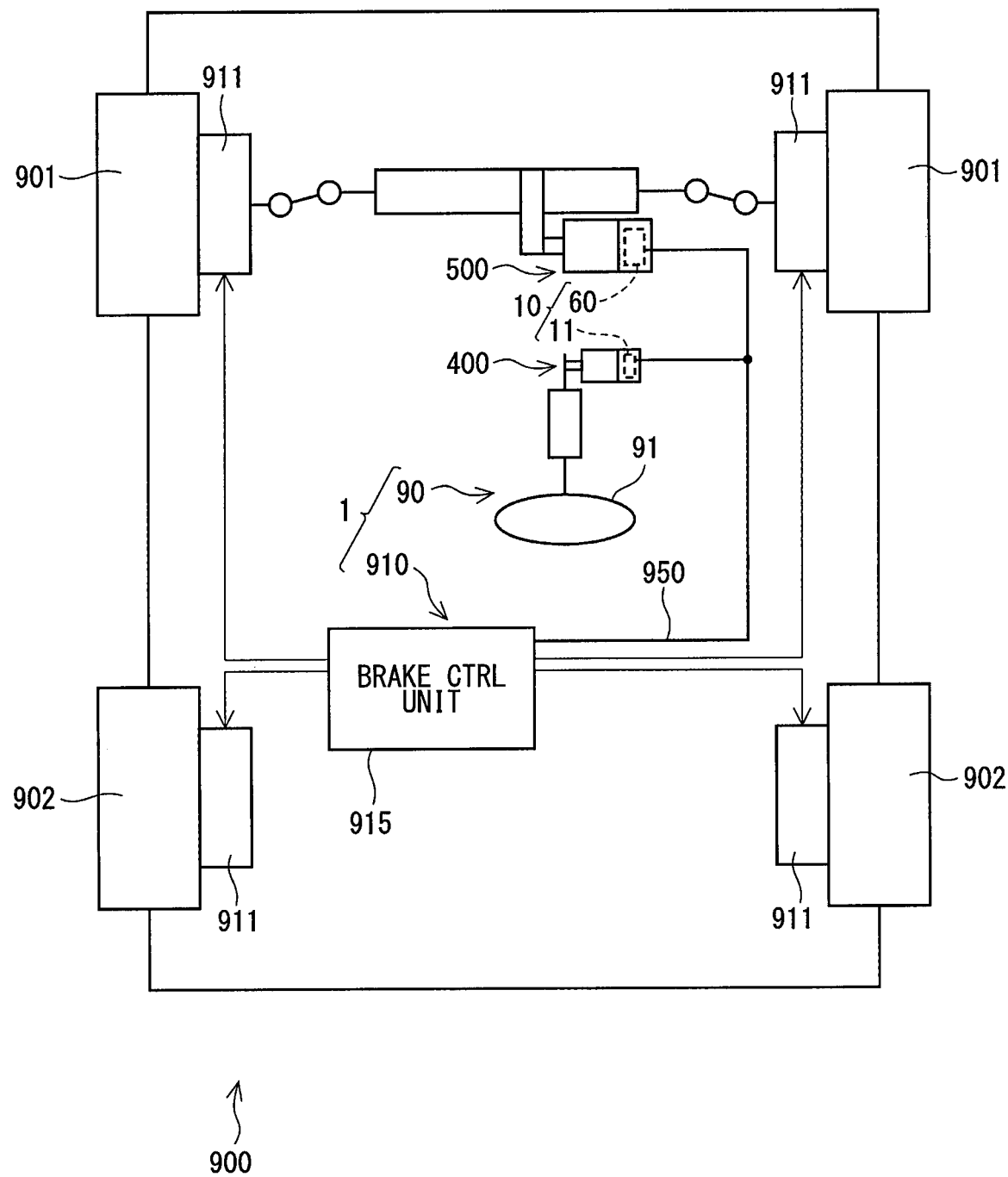
FIG. 1 is a diagram schematically illustrating a vehicle control system according to a first embodiment.

A first embodiment will be illustrated with reference to FIG. 1 to FIG. 8. FIG. 1 illustrates a vehicle control system 1 including a steer-by-wire system 90 and a brake system 910.

The brake system 910 includes brake actuators 91 and a brake control unit 915. The brake actuators 911 are provided for four wheels, respectively. The four wheels are a pair of front wheels and a pair of rear wheels 902, and the front wheels are steered wheels 901. The brake control unit 915 is capable of individually changing braking forces to the steered wheels 901 and the rear wheels 902 by controlling the brake actuators 911. The brake system 910 may be any brake system as long as different braking forces are applicable to respective left and right wheels. The brake control unit 915 obtains wheel speeds of the steered wheels 901 and the rear wheels 902 from wheel speed sensors not shown, and calculates a vehicle speed V based on the wheel speeds.

Figure 2:
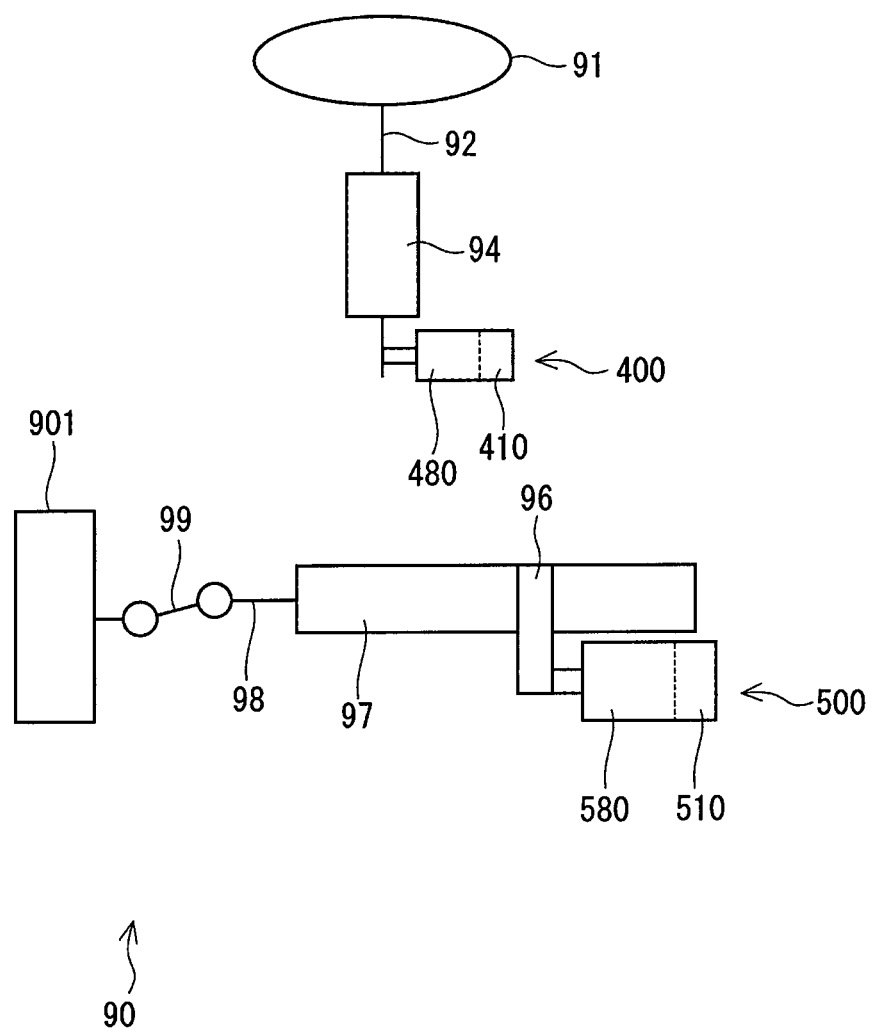
FIG. 2 is a diagram schematically illustrating a steer by wire system according to the first embodiment.

As illustrated in FIG. 2, the steer-by-wire system 90 includes a steering wheel 91, a steering shaft 92, a torque sensor 94, a pinion gear 96, a rack shaft 97, a tie rod 98, a knuckle arm 99, a reaction force device 400, and a turning device 500. The reaction force device 400 includes a reaction force control unit 410 and a reaction force motor 480. The turning device 500 includes a turning control unit 510 and a turning motor 580.

The steering wheel 91 is provided on one end of the steering shaft 92. The torque sensor 94, which detects input torque, is provided on the steering shaft 92. The steering shaft 92 is provided so as to be mechanically separable from the rack shaft 97 Although the steering shaft 92 and the rack shaft 97 are perfectly separated in FIG. 2, a clutch capable of switching between disconnection and connection may be provided between the steering shaft 92 and the rack shaft 97.

The reaction force motor 480 is connected to the steering shaft 92. The reaction force motor 480 provides appropriate steering feeling to the driver by applying a reaction force that depends on a driver's steering operation to the steering wheel 91.

The turning motor 580 controls turning angle of the steered wheels 901. In the embodiment, rotation of the turning motor 580 rotates the pinion gear 96. Rotational motion of the pinion gear 96 is converted into a liner motion of the rack shaft 97 by the rack and pinion. The tie rod 98 is provided on both ends of the rack shaft 97, and the orientation of the steered wheels 901 is changed when the tie rod 98 pulls or pushes the knuckle arm 99. Because of this, the pair of steered wheels 901 is turned to have an angle that depends on displacement of the rack shaft 97.

A reaction force control unit 410 is integrally provided in the reaction force device 400 on one side of the motor 480 in its axis direction, which are so called a machine-electric integrated type. A turning control unit 510 is integrally provided in the turning device 500 on one side of the motor 580 in its axis direction, which are so called a machine-electric integrated type. The machine-electric integrated type makes it possible to efficiently arrange the reaction force device 400 and the turning device 500 in a mounting-space-limited vehicle.

At least one of the reaction force device 400 and the turning device 500 may be of a machine-electric separated type in which a motor and a control unit are provided separately from each other. In the present embodiment, because mechanical structures of the reaction force device 400 and the turning device 500 are substantially the same, description will be given of the reaction force device 400. Of course, the reaction force device 400 and the turning device 500 may have different mechanical structures.

Figure 3:
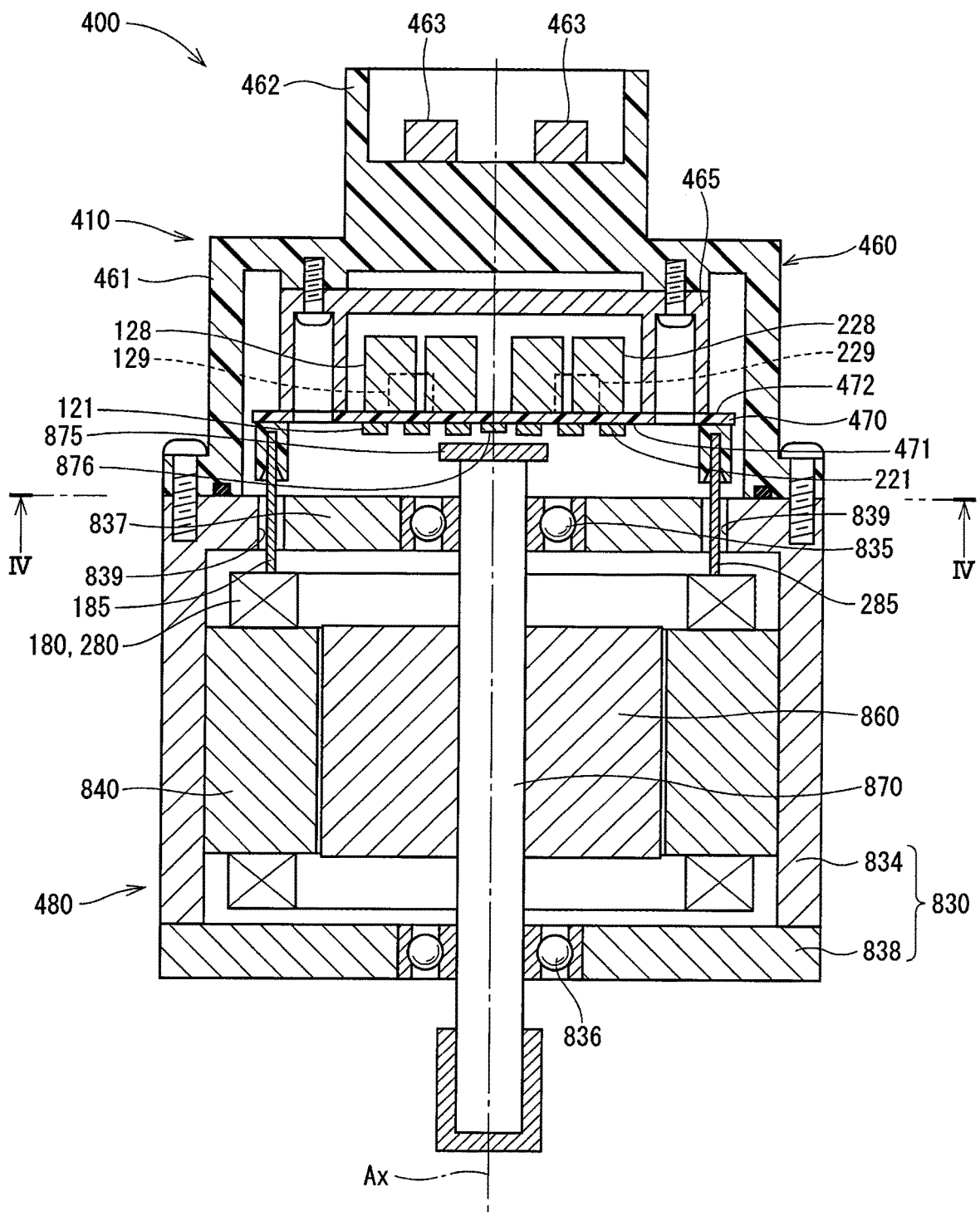
FIG. 3 is a cross-sectional view illustrating a reaction force device according to the first embodiment.
Figure 4:
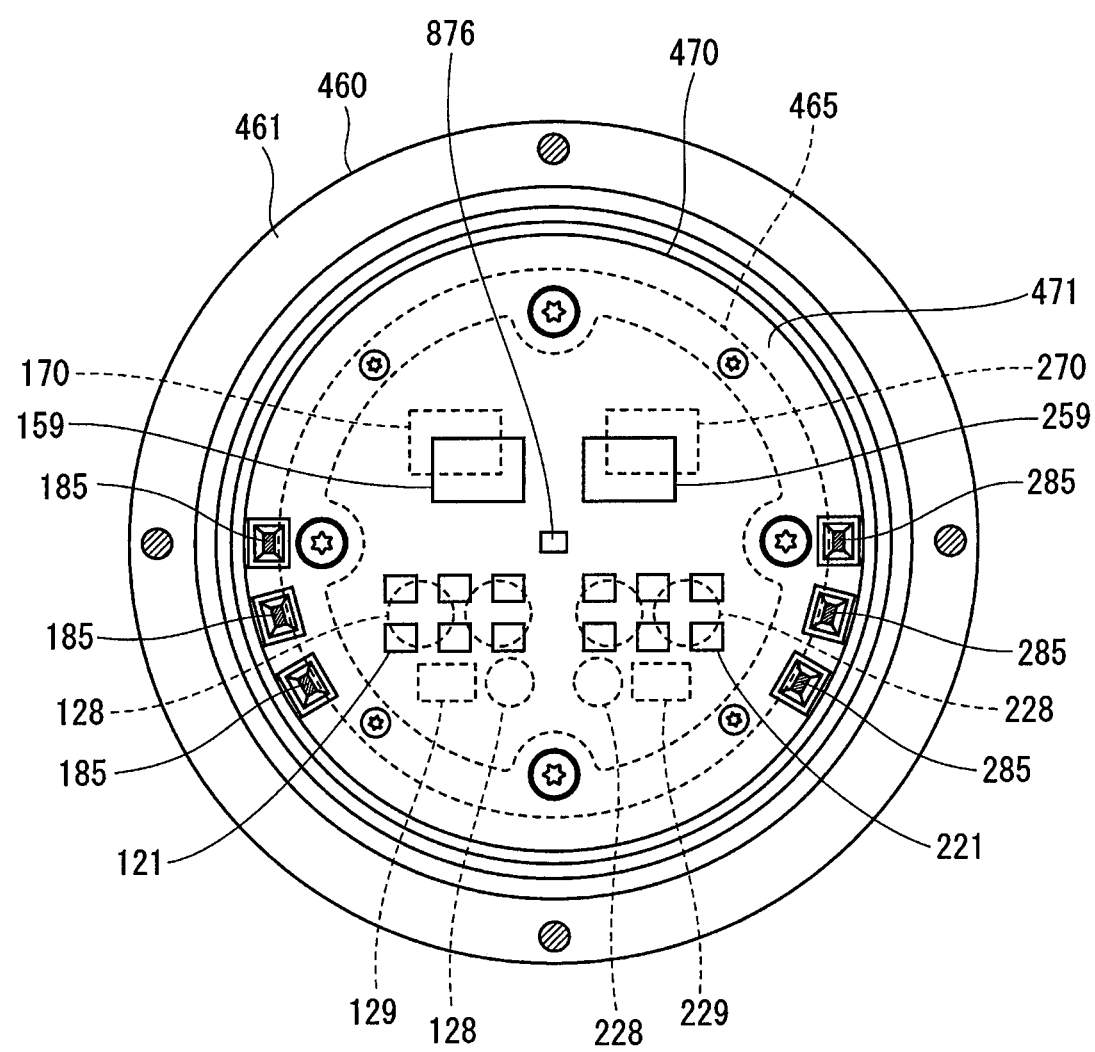
FIG. 4 is a cross-sectional view taken along line IV-IV of FIG. 3.

As illustrated in FIG. 3 and FIG. 4, the reaction force motor 480 is a 3-phase brushless motor, and includes a stator 840, a rotor 860, a housing 830 housing the stator 840 and the rotor 860, and the like.

The reaction force motor 480 includes a first motor winding 180 and a second motor winding 280 as a pair of windings. The two motor windings 180, 280 are equal in electrical properties, and are wound around the same stator 840 in a cancel-winding manner to differ from each other by electrical angle of 30-degrees. Accordingly, control is performed so that phase currents flowing in the respective motor windings 180, 280 have phases $\varphi$ that are different from each other by the electrical angle of 30 degrees. Optimizing a current phase difference increases output torque. Optimizing a current phase difference also enables to reduce sixth torque ripple. Furthermore, the energization with the phase difference causes the currents to be averaged. This may maximize cancel merit of noise and vibration. Heat generation is also averaged, which may reduce inter-system error that depends on temperature such as detection value of each sensor and torque and average amount of current capable of being conducted.

Hereinafter, a configuration relating to driving control of the first motor winding 180 is referred to also as a first system, and a configuration relating to driving control of the second motor winding 280 is referred to also as a second system. Reference numerals assigned to elements of the first system L1 are 100 plus a two-digit number. Reference numerals assigned to elements of the second system L2 are 200 plus a two-digit number.

The stator 840 is fixed to the housing 830. The motor windings 180, 280 are wound around the stator 840. The rotor 860 is provided on an inner side of the stator 840 in its radial direction, and is rotatable relative to the stator 840.

A shaft 870 is inserted in the rotor 860 and integrally rotated with the rotor 860. The shaft 870 is supported by bearings 835, 836 so that the shaft 870 is rotatable relative to the housing 830. An end of the shaft 870, which is one of ends closer to the reaction force control unit 410 than the other, is projected from the housing 830 toward the reaction force control unit 410. A magnet 875 serving as a detection target is provided on the end of the shaft 870 on a reaction force control unit 410 side.

The housing 830 includes a case 834 having a bottomed cylindrical shape including a rear frame end 837, and a front frame end 838 provided on the opening side of the case 834. The case 834 and the front frame end 838 are fastened with each other with a bolt and the like. Lead wire insertion holes 839 are formed on the rear frame end 837. Lead wires 185, 285 connected to respective phases of the motor windings 180, 280 are inserted in the respective lead wire insertion holes 839. The lead wires 185, 285 are taken out from the lead wire insertion holes 839 toward the reaction force control unit 410 and are connected to a circuit board 470.

The reaction force control unit 410 includes a cover 460, a heat sink 465 fixed to the cover 460, the circuit board 470 fixed to the heat sink 465, various electronic components mounted on the circuit board 470, and the like.

The cover 460 protects the electronic components from an impact applied from an outside. The cover 460 also prevents dust and water from entering into the reaction force control unit 410. A cover main body 461 and a connector 462 are integrally formed in the cover 460. The connector 462 and the cover main body 461 may be discrete parts. Terminals 463 of the connector 462 are connected to the circuit board 470 via a wiring or the like not shown. The number of connectors and the number of terminals are changeable as appropriate depending on the number of signals or the like. The connector 462 is provided on an end of the axis direction of the reaction force device 400, and has an opening that opens in a direction away from the motor 480.

The circuit board 470 is, for example, a printed circuit board, and is arranged to face the rear frame end 837. Electronic components are mounted on the circuit board 470 independently for each of the two systems, so that the two systems provide fully redundant systems. In one embodiment, the electronic components are mounted on one circuit board 470, but the electronic components may be mounted on discrete circuit boards.

The circuit board 470 has two main surfaces. One main surface on a motor 480 side is referred to also as a motor surface 471. The other surface opposite to the motor surface 471 is referred to also as a cover surface 472. As illustrated in FIG. 4, switching elements 121, 221 constituting a driving circuit 57 for switching energization of the motor windings 180, 280, a rotation angle sensor 876, custom ICs 159, 259, and the like are mounted on the motor surface 471. The rotation angle sensor 876 is mounted at a portion facing the magnet 875 to detect a magnetic field change with rotation of the magnet 875.

Capacitors 128, 228, inductors 129, 229, microcomputers 170, 270, and the like are mounted on the cover surface 472. The capacitors 128, 228 smooth electric power input from a battery not shown. The capacitors 128, 228 also assist power supply to the motor 480 by charging. The capacitors 128, 228, and the inductors 129, 229 form a filter circuit, and reduce noise transmitted from another device that shears the battery, and reduce noise transmitted from the reaction force device 400 to the other device that shears the battery. A power relay, a motor relay, a current sensor, and the like not shown are also mounted on the motor surface 471 or the cover surface 472.

As illustrated in FIG. 1, the reaction force control unit 410 includes a reaction force controller 11. The turning control unit 510 includes a turning controller 60. The reaction force controller 11, the turning controller 60, and the brake control unit 915 are connected by communication lines 950, and are communicable with each other using, for example, a controller area network (CAN). A communication system other than the CAN may be employed, and a wireless communication using no wired communication lines 950 may be employed.

The reaction force controller 11, the turning controller 60, and the brake control unit 91 include microcomputers as their main components. The microcomputer includes a CPU, a ROM, a RAM, an I/O, and a bus line connecting the foregoing. Each processing in the reaction force controller 11, the turning controller 60, and the brake control unit 915 may be software processing performed by a CPU that executes a program pre-stored in a tangible memory device such as a ROM (that is, non-transitory computer-readable tangible medium), or may be hardware processing performed by a dedicated electronic circuit. In the embodiment, the reaction force controller 11 includes the microcomputers 170, 270. Because the first and systems perform substantially the same turning control and substantially the same reaction force control, the controls by the first system will be described below.

Figure 5:
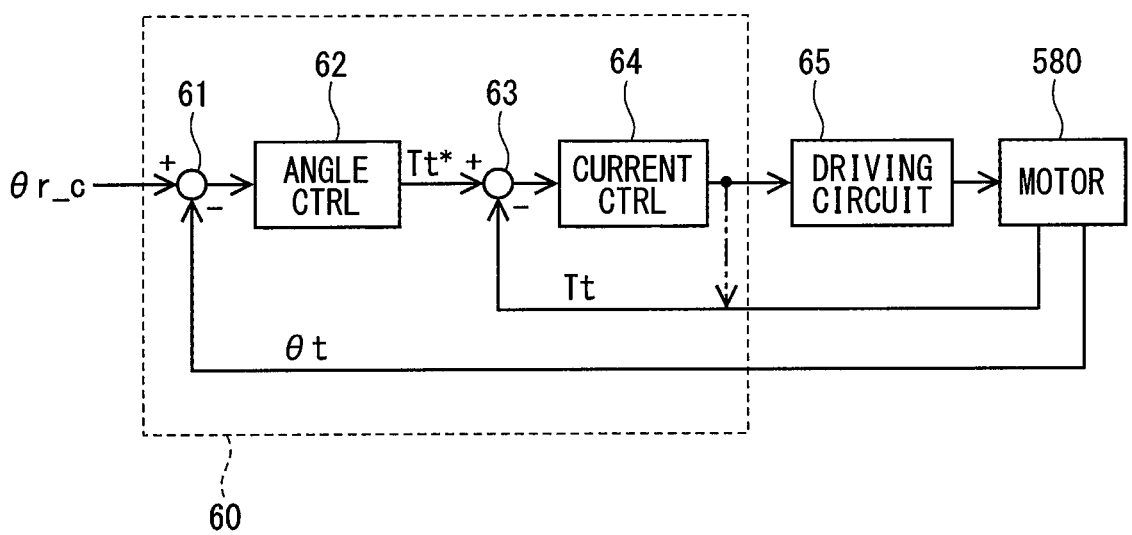
FIG. 5 is a block diagram illustrating a turning controller according to the first embodiment.

As illustrated in FIG. 5, the turning controller 60 includes a subtractor 61, an angle control unit 62, a subtractor 63, a current control unit 64, and the like. Specifically, the microcomputer(s) of the turning controller 60 is configured to act as the subtractor 61, then angle control unit 62, the subtractor 63, the current control unit 64, and the like. The subtractor 61 subtracts a turning motor rotation angle θt, which angle θt is a rotation angle of the turning motor 580, from a reaction force motor rotation angle converted value θr_c to calculate an angular deviation Δθ. The reaction force motor rotation angle converted value θr_c is a converted value of a reaction force motor rotation angle θr to be aligned with the turning motor rotation angle θt. The angle control unit 62 calculates a turning torque command value Tt* such that the angular deviation Δθ converges to zero so as to obtain a desired turning angle.

The subtractor 63 subtracts a turning torque Tt fed back from the turning motor 580 from the turning torque command value Tt* to calculate a turning torque deviation ΔTt. The current control unit 64 calculates a voltage command value by, for example, performing PI calculation or the like such that the turning torque deviation ΔTt converges to zero, and generates a driving signal that depends on the voltage command value. By controlling on-off operation of the switching elements constituting a driving circuit 65 based on the generated driving signal, torque that depends on the turning torque command value Tt* is output from the turning motor 580.

Figure 6:
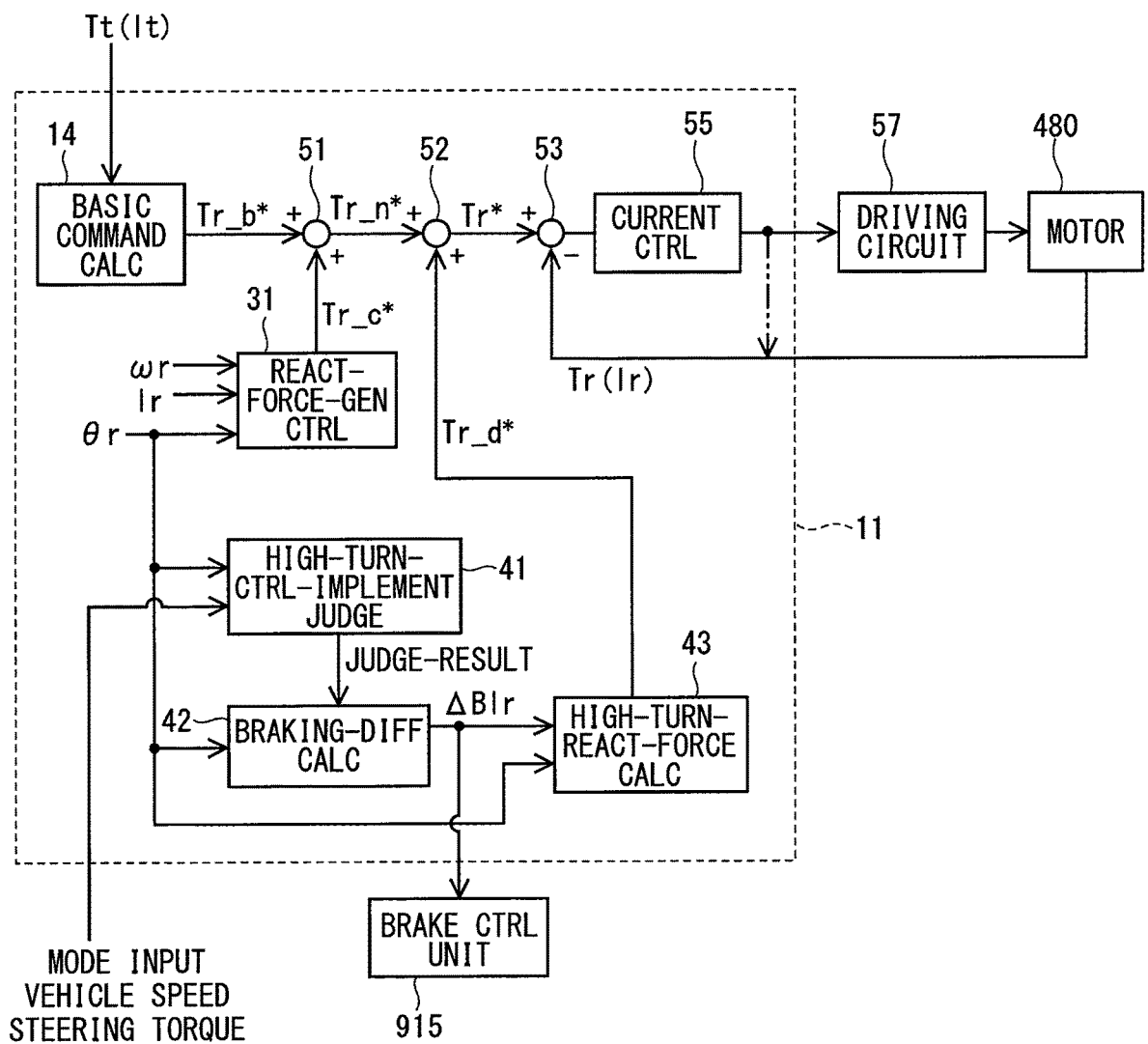
FIG. 6 is a block diagram illustrating a reaction force controller according to the first embodiment.

As illustrated in FIG. 6, the reaction force controller 11 includes a basic command calculation unit 14, a reaction force generation control unit 31, a high turning control implementation judge unit 41, a braking difference calculation unit 42, a high turning time reaction force calculation unit 43, adders 51, 52, a subtractor 53, a current control unit 55, and the like. Specifically, the microcomputer(s) of the reaction force controller 11 is configured to as the basic command calculation unit 14, the reaction force generation control unit 31, the high turning control implementation judge unit 41, the braking difference calculation unit 42, the high turning time reaction force calculation unit 43, the adders 51, 52, the subtractor 53, the current control unit 55, and the like The basic command calculation unit 14 calculates a basic reaction torque command value Tr_b* based on the turning torque Tt. The reaction force generation control unit 31 calculates an application reaction torque command value Tr_c* based on the reaction force motor rotation angle θr, a reaction force motor angular speed ωr, and reaction force motor current Ir, where the reaction force motor rotation angle θr is a rotation angle of the reaction force motor 480, the reaction force motor angular speed ωr is a rotational angular speed of the reaction force motor 480, and the reaction force motor current Ir is a current of the reaction force motor 480.

The high turning control implementation judge unit 41 judges whether to perform high turning control. In the embodiment, the high turning control refers to the control that provides the braking forces different to the left and right steered wheels 901 to cause the smaller turning radius than the turning only by the turning device 500. The high turning control implementation judge unit 41 performs high turning control when: a high turning mode is on; the reaction force motor rotation angle θr is not less than the first threshold θht1; a steering torque |Ts| is not less than a steering torque judgment threshold Ts_th; and the vehicle speed V is within a preset range.

Depending on the reaction force motor rotation angle θr, the braking difference calculation unit 42 calculates a braking force difference ΔBlr, which is a difference between braking forces applied to the left and right wheels. The calculated braking force difference ΔBlr is output to the high turning time reaction force calculation unit 43 and the brake control unit 915. The brake control unit 915 controls the brake actuators 911 to provide the calculated braking force difference ΔBlr.

The high turning time reaction force calculation unit 43 calculates a high turning time reaction torque command value Tr_d* for the high turning control. The high turning time reaction torque command value Tr_d* is zero when the high turning control is not being performed, that is, when the braking force difference ΔBlr is zero.

The adder 51 adds the basic reaction torque command value Tr_b* and the application reaction torque command value Tr_c* to calculate a normal reaction torque command value Tr_n*. The adder 52 adds the high turning time reaction torque command value Tr_d* to the normal reaction torque command value Tr_n* to calculate the reaction torque command value Tr*.

The subtractor 53 subtracts a reaction torque Tr fed back from the motor 480 from the reaction torque command value Tr* to calculates a reaction torque deviation ΔTr. The current control unit 55 calculates a voltage command value by, for example, performing PI calculation or the like such that the reaction torque deviation ΔTr converges to zero, and generates a driving signal that depends on the voltage command value. By controlling on-off operation of the switching elements 121, 221 (see FIG. 4) constituting the driving circuit 57 based on the generated driving signal, torque that depends on the reaction torque command value Tr* is output from the reaction force motor 480.

In FIG. 6, although the description is made on the assumption that the torque of the reaction force motor 480 is fed back to control the reaction force motor 480 by torque feedback control, driving of the reaction force motor 480 may be controlled by current feedback control as illustrated by the arrow of a two-dot chain line and the parenthesis in FIG. 6. The same applies to the control in the turning controller 60 and the second embodiment.

Figure 7:
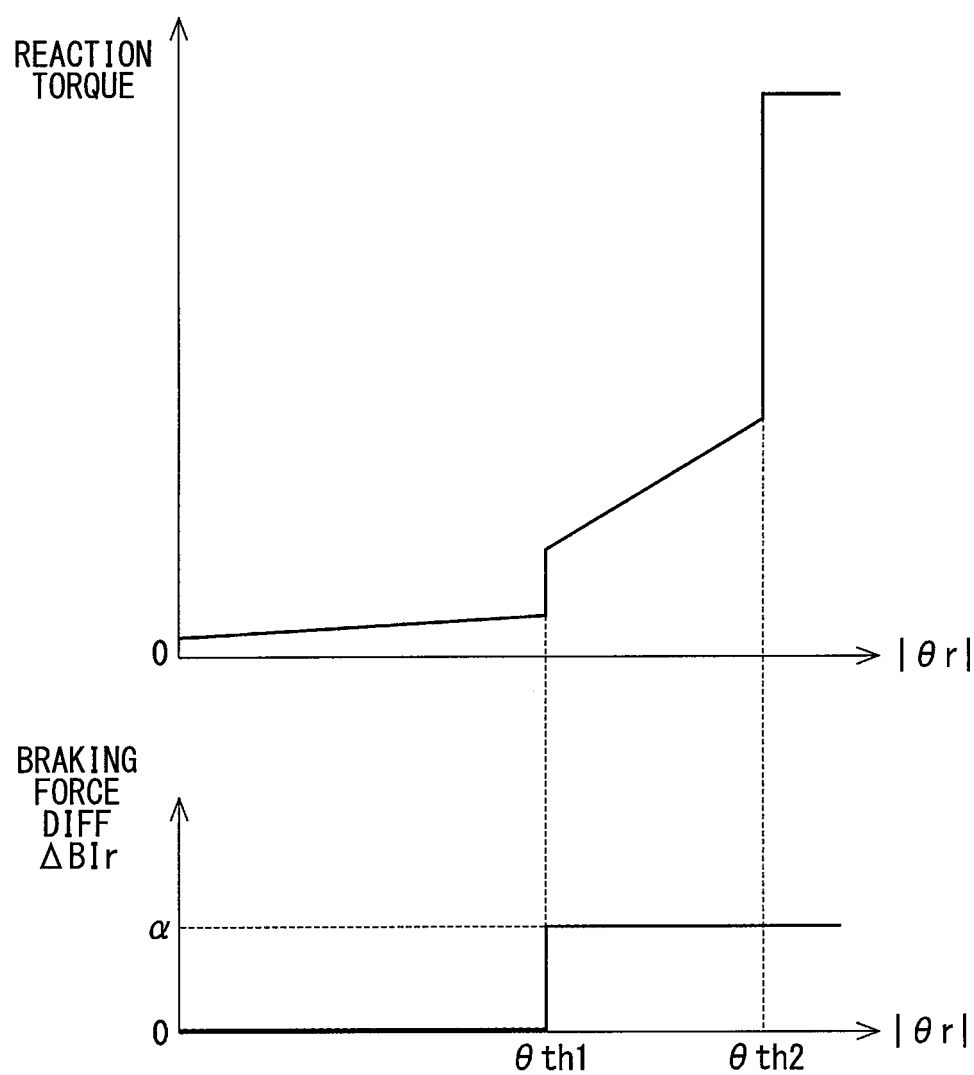
FIG. 7 is a diagram illustrating a reaction force and a braking force difference according to the first embodiment.

FIG. 7 illustrates a reaction force that depends on the reaction force motor rotation angle θr and the braking force difference. In FIG. 7, a horizontal axis denotes an absolute value of the reaction force motor rotation angle θr, the vertical axis in the upper graph denotes reaction torque, and, the vertical axis in the lower stage denotes the braking force difference ΔBlr. The first threshold θth1 is the maximum angle of the turning by the turning device 500. For example, in the electric power steering device, the maximum angle corresponds to the end contact state.

The second threshold θth2 is the maximum angle of the turning by the braking force difference between the left and right wheels. It may be preference to operate both the turning and the braking force difference in the region between the first threshold θth1 and the second threshold θth2. In place of the limit of the turning device 500, the first threshold θth1 may be set at a value smaller than the limit of the turning device 500. In this case, both the turning and the braking force difference may be operated before the turning device 500 reaches the limit.

When the reaction force motor rotation angle θr is smaller than the first threshold θth1, the vehicle turning with the steering angle θs by the turning device 500 is implementable. Therefore, the braking force difference ΔBlr is set zero. When the reaction force motor rotation angle θr is not less than the first threshold θth1, the braking force difference ΔBlr is set to a predetermined value α. Note that, the braking force difference ΔBlr may be increased depending on a high turning required angle θh so that the reaction force motor rotation angle θr has the predetermined value α between the first threshold θth1 and the second threshold θth2. In the embodiment, the value obtained by subtracting the first threshold θth1 from the absolute value of the reaction force motor rotation angle θr is referred to also as a high turning required angle θh (see Formula (1)).

$$\theta h = |\theta r| - \theta th1 \quad (1)$$

When the high turning control using the braking force difference ΔBlr is being performed, torque provided depending on the high turning time reaction torque command value Tr_d* is added to cause the steering wheel 91 to hardly rotate, as compared with when the high turning control is not performed. By changing the reaction torque in a stepwise manner before and after the start of the high turning control, it is possible convey physical presentation to the driver to inform that the high turning control is being performed. In the embodiment, the reaction torque Tr increases with increasing high turning required angle θh, so that it is difficult for the driver to further rotate the steering wheel 91.

In the embodiment, the high turning time reaction torque command value Tr_d* increases with increasing high turning required angle θh, and thereby the reaction torque Tr increases.

The second threshold θth2 is the limit of turning by the braking force difference ΔBlr. Accordingly, when the reaction force motor rotation angle θr is not less than the second threshold θth2, the high turning time reaction torque command value Tr_d* is set to such a large value that the driver cannot rotate the steering wheel 91. This informs the driver that further steering is unavailable.

Figure 8:
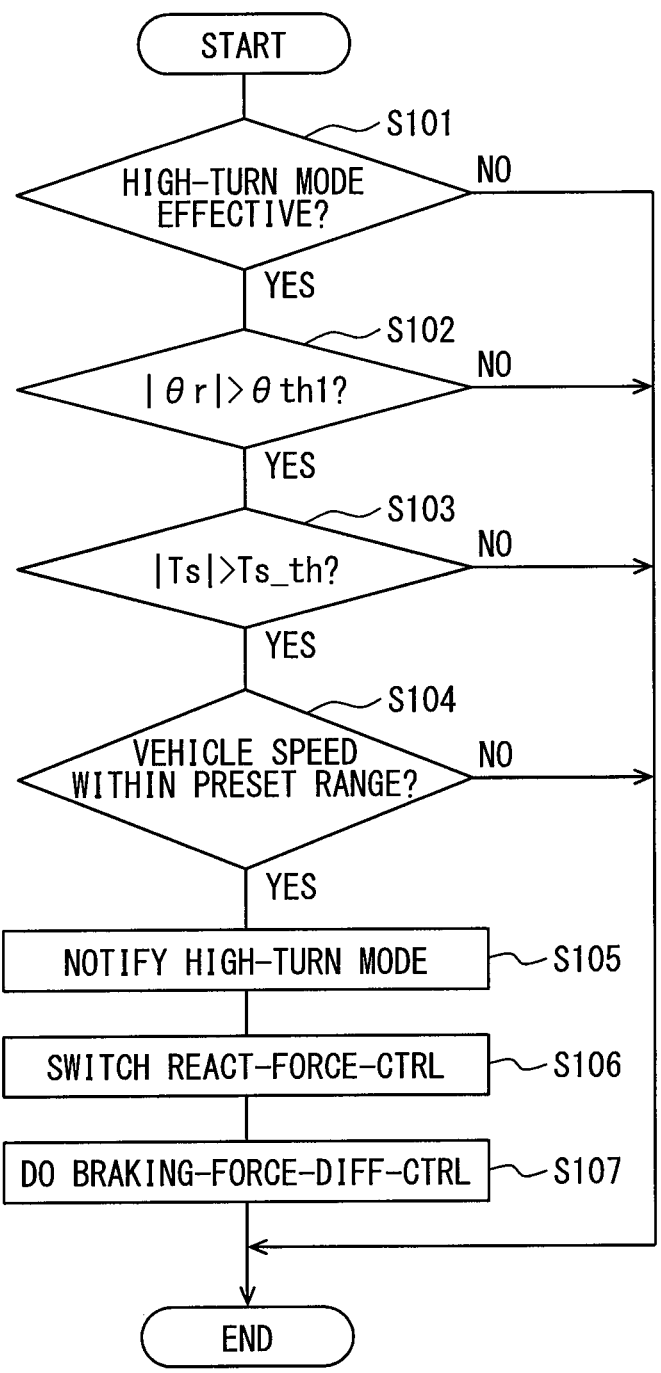
FIG. 8 is a flowchart illustrating turning control processing according to the first embodiment.

Turning control processing in the embodiment will be described with reference to a flowchart illustrated in FIG. 8. This processing is performed at predetermined cycles in the reaction force controller 11. Although every processing is performed by the reaction force controller 11 in the below description, at least some of the processing may be performed by the turning controller 60, the brake control unit 915, or another controller. Specifically, the processing may be performed by one or more microcomputer of one or some or all or any combination of the turning controller 60, the brake control unit 915 and another controller. In the second embodiment, the processing may be performed by a reaction force controller 12 instead of the reaction force controller 11. The same applies to a third embodiment and a fourth embodiment.

In S101, the high turning control implementation judge unit 41 judges whether the high turning mode is effective. Herein, the judgment is made based on how the driver operated a switch, specifically, based on the user's switch operation for allowing the high turning mode. When it is judged that the high turning mode is not effective (NO in S101), no subsequent processing is performed. When it is judged that the high turning mode is effective (YES in S101), the processing proceeds to step S102.

In S102, the high turning control implementation judge unit 41 judges whether the reaction force motor angle θr is larger than the first threshold θth1. When it is judged that the reaction force motor angle θr is less than or equal to the first threshold θth1 (NO in S102), the control is performed to turn the vehicle 900 without performing the subsequent processing. When it is judged that the reaction force motor angle θr is larger than the first threshold θth1 (YES in S102), the processing proceeds to S103.

In S103, the high turning control implementation judge unit 41 judges whether the absolute value |Ts| of the steering torque detected by the torque sensor 94 is larger than the steering torque judgment threshold Ts_th (e.g., 5 [Nm]). The steering torque judgment threshold Ts_th is set to such a value that whether the user desires high turning is determinable. When it is judged that the absolute value |Ts| of the steering torque is less than or equal to the steering torque judgment threshold Ts_th (NO in S103), subsequent processing is not performed. When it is judged that the absolute value |Ts| of the steering torque is larger than the steering torque judgment threshold Ts_th (YES in S103), the processing proceeds to S104.

In S104, the high turning control implementation judge unit 41 judges whether the vehicle speed V is within a preset range. The preset range is set to such a range that the high turning mode by the braking force difference is implementable. For example, the preset range is larger than 4 km/h and less than 30 km/h. When it is judged that the vehicle speed V is not within the preset range (NO in S104), subsequent processing is not performed. When it is judged that the vehicle speed V is within the preset range (YES in S104), the processing proceeds to step S105.

In step S105, the reaction force controller 11 notifies the user of the high turning mode, which is the mode where the vehicle 900 turns using the braking force difference between the left and right wheels. Any other methods such as, for example, display on an instrument panel, notification by voice, or the like may be used to notify the user of the high turning mode.

Because of the high turning mode, in S106, the reaction force controller 11 switches reaction force control into such control that rotation of the steering wheel 91 is difficult. Specifically, the reaction force controller 11 adds the high turning time reaction torque command value Tr_d* to the normal reaction torque command value Tr_n*.

In S107, the braking difference calculation unit 42 outputs the calculated braking force difference ΔBlr to the brake control unit 915. The brake control unit 915 controls the brake actuators 911 to realize the braking force difference ΔBlr.

In the embodiment, in a case where the steering angle θs is greater than or equal to the maximum turning angle by the turning device 500, different braking forces are provided to the left and right wheels, and thereby the turning radius is made smaller. This enables the vehicle to, for example, park in a narrow space or make a U-turn on a narrow alley. In a case where the steering angle θs is smaller than the maximum turning angle by the turning device 500, different braking forces to the left and right wheels are not provided. This reduces an uncomfortable feeling of the driver.

Now, a steering and braking cooperative operation will be described. The braking more quickly responds to vehicle movement than the turning. The driver performing a steering operation during travel perceives yaw. Accordingly, when the performs a transitional steering operation to change a direction or a traveling course of the vehicle 900 for emergency avoidance or lane change, a transitional braking is implemented, so that the driver can coordinate steering and braking without uncomfortable feeling. Furthermore, when the control is performed to generate the steering-caused yaw earlier than the braking or to complement the turning limit with the braking, the user's steering operation and the vehicle motion match each other.

For example, in some conventional electric power steering devices, the driver's steering operation is boosted to move a rack stroke to turn the steered wheels. In addition, in cases of driving in a parking lot or making a U-turn where the vehicle 900 moves at a low speed and has a large turning angle before reaching to a specific position, the driver is typically unaware of yaw. Accordingly, when the braking is performed in this state, mismatch between the driver's steering operation and the motion of the vehicle 900 may occur. The corporative operation of the braking and turning may disadvantageously give the driver uncomfortable feeling. Furthermore, in conventional electric power steering devices, control is performed based on a driver's force to the steering wheel in a state where the steering wheel is steered to a limit position and further rotation of the steering wheel is impossible. In such conventional electric power steering devices, appropriate control is difficult.

However, the turning control processing according to the embodiment is applied to the steer-by-wire system 90. In the steer-by-wire system 90, the steering wheel 91 and the steered wheel 901 are mechanically separatable from each other, and both the turning and the braking are controllable responsive to the driver's steering operation. Specifically, the turning and the braking difference are controllable responsive to the steering angle θs and the reaction force provided to the driver by the reaction force device 400 is controllable. Thereby, it is possible to match the driver's steering operation and the behavior of the vehicle 900 while providing an operating state of the vehicle 900 to the driver. Accordingly, it is possible to operate the turning and braking cooperatively, without giving an uncomfortable feeling to the driver.

As described above, the reaction force controller 11 in the vehicle control system 1 of the embodiment controls turning of the vehicle 900. The vehicle control system 1 includes the steer-by-wire system 90 and the brake system 910. The steer-by-wire system 90 is capable of mechanically separating the steering wheel 91 and the steered wheel 901 from each other, and includes the turning device 500 and the reaction force device 400. The turning device 500 generates torque to turn the steered wheel 901 depending on the steering state of the steering wheel 91. The reaction force device 400 applies a reaction force to the steering wheel 91. The brake system 910 is capable of control braking of the left and right wheels independently.

The reaction force controller 11 includes the braking difference calculation unit 42 for calculating the braking force difference ΔBlr, which is a difference in braking force between the left and right wheels. When the absolute value of the reaction force motor rotation angle θr is larger than the first threshold θth1, the braking difference calculation unit 42 performs the high turning control, which control provides the braking force difference ΔBlr to the left and right wheels to cause a smaller turning radius of the vehicle 900. In the embodiment, the first threshold θth1 is set based on a limit of turning by the turning device 500. This may reduce the turning radius as compared with the cases of turning made by the turning device 500 only. Accordingly, parking in a narrow space and making a U-turn on a narrow alley are facilitated.

In the steer-by-wire system 90, the steered wheels 901 are mechanically separated from the steering wheel 91. Thus, even when turning angle of the steered wheel 901 is maximum, the steer-by-wire system 90 can further rotate the steering wheel 91. Accordingly, it is possible to reduce uncomfortable feeling of the driver by performing the high turning control in which the braking difference is implemented based on the steering angle θs when the steering angle θs is large.

When the high turning control is being performed, the reaction force applied to the steering wheel 91 is controlled to be larger than when the high turning control is not being performed. Specifically, the reaction force controller 11 includes the high turning time reaction force calculation unit 43. When the high turning control is being performed, the high turning time reaction force calculation unit 43 calculates the high turning time reaction torque command value Tr_d* is calculated. Further, a value obtained by adding the high turning time reaction torque command value Tr_d* to the normal reaction torque command value Tr_n* is used as the reaction torque command value Tr*. Accordingly, when the high turning control is being performed, the steering wheel 91 is more difficult to rotate, as compared with when the high turning control is not being performed. It becomes possible to present to the driver that the high turning control is being performed.

The second threshold θth2 is set larger than the first threshold θth1. Specifically, in the embodiment, the second threshold θth2 is set depending on the limit of turning by the braking force difference ΔBlr. When the reaction force motor rotation angle θr is larger than the second threshold θth2, the reaction force applied on the steering wheel 91 is set larger than when the reaction force motor rotation angle θr is less than or equal to the second threshold θth2. For example, when the reaction force applied when the reaction force motor rotation angle θr is larger than the second threshold θth2 is referred to also as a particular reaction force, this particular reaction force is set to such a large reaction force that it is impossible for the driver to rotate (cannot steer) the steering wheel 91. By this setting, it is possible to present to the driver that a further decrease in the turning radius is unobtainable.

When it is judged that the absolute value of the turning torque Ts input by the driver is larger than the steering torque judgment threshold Ts_th (YES in S103), the high turning control is allowed. In other words, when it is judged that the absolute value of the turning torque Ts is less than or equal to the steering torque judgment threshold Ts_th, the high turning control is not performed. In the embodiment, this judgment is made based on a detection value of the torque sensor 94.

When the vehicle speed V is within a preset range (YES in S104), the high turning control is allowed. In other words, when the vehicle speed V is out of the preset range, the high turning control is not performed. Accordingly, it is possible to perform the high turning control appropriately.

In the embodiment, the reaction force controller 11 corresponds to a turning control device. The steering wheel 91 corresponds to a steering member. The reaction force motor rotation angle θr corresponds to a steering angle corresponding value. The first threshold θth1 corresponds to a judgment threshold and a first judgment threshold. The second threshold θth2 corresponds to a second judgment threshold.

Second Embodiment

Figure 9:
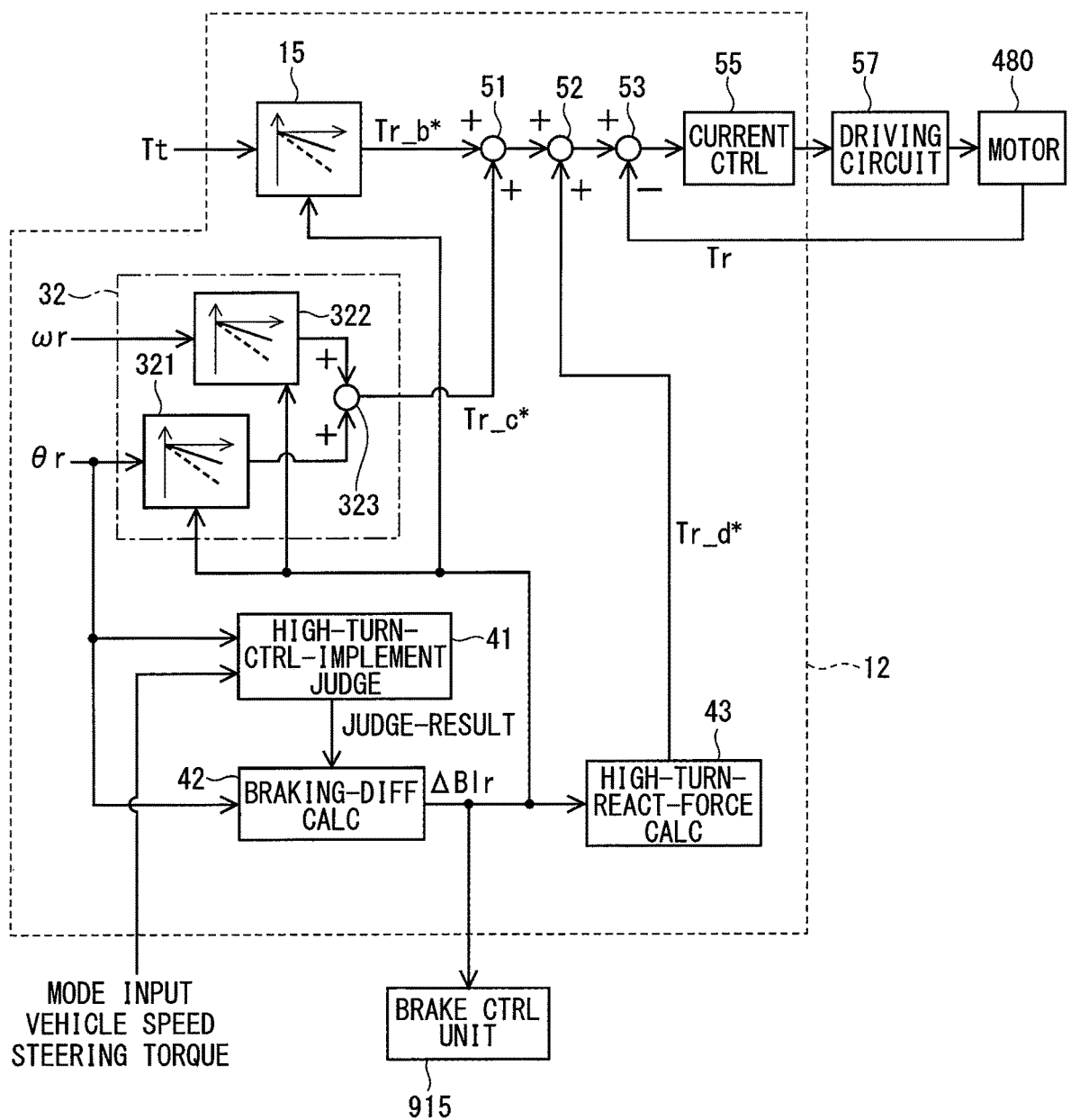
FIG. 9 is a block diagram illustrating a reaction force controller according to a second embodiment.

A second embodiment will be described with reference to FIG. 9 and FIG. 10. The reaction force controller 12 of the embodiment includes a basic reaction force calculation unit 15, a reaction force generation control unit 32, a high turning control implementation judge unit 41, a braking difference calculation unit 42, a high turning time reaction force calculation unit 43, adders 51, 52, a subtractor 53, a current control unit 55, and the like.

The basic reaction force calculation unit 15 calculates a basic reaction torque command value Tr_b* such that a result of this calculation differs depending on whether the high turning control is being performed. In the embodiment, a map used for calculating the basic reaction torque command value Tr_b* is switched depending on whether the high turning control is being performed.

Figure 10:
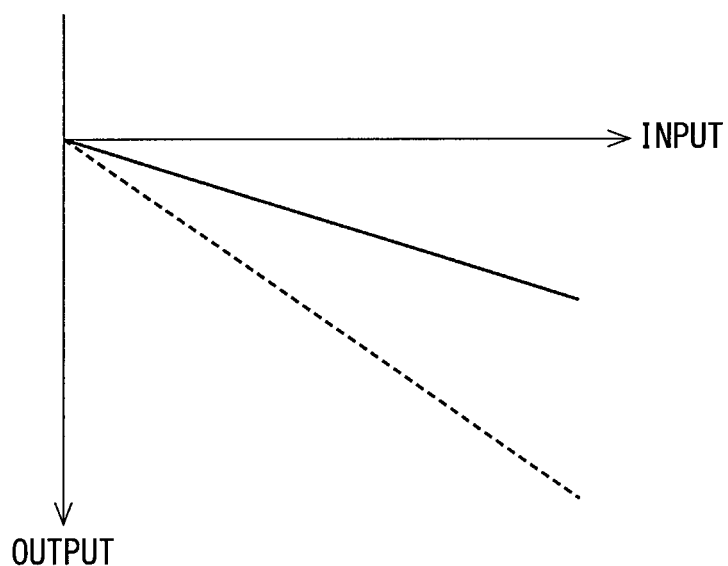
FIG. 10 is diagram schematically illustrating a reaction-force-command calculation map according to the second embodiment.

In the map illustrated in FIG. 10, a horizontal axis denotes input and a vertical axis denotes output. Further, the map to be used when the high turning control is not being performed is depicted as a solid line. The map to be used when the high turning control is being performed is depicted as a dashed line. Herein, the output is a value relating to the reaction torque command, and thus, the reaction torque applied to the steering wheel 91 is such that as the absolute value of the negative reaction torque command is larger, the steering wheel 91 is hard to rotate (i.e., the driver feels the steering wheel is heavy).

On the premise that the input to the map is the turning torque Tt and the output from the map is the basic reaction torque command value Tr_b*, the basic reaction force calculation unit 15 switches the maps depending on the braking force difference ΔBlr input. Specifically, when the braking force difference ΔBlr is zero, that is, when the high turning control is not being performed, the map shown as the solid line in FIG. 10 is used to calculate the basic reaction torque command value Tr_b*. When the braking force difference ΔBlr is larger than zero, that is, when the high turning control is being performed, the map shown as the dashed line in FIG. 10 is used to calculate the basic reaction torque command value Tr_b*.

The reaction force generation control unit 32 includes an angle reference reaction torque calculation unit 321, an angular speed reference reaction torque calculation unit 322, and an adder 323. The angle reference reaction torque calculation unit 321 and the angular speed reference reaction torque calculation unit 322 switch the maps depending on the input braking force difference ΔBlr, like the basic reaction force calculation unit 15 does.

Specifically, on the premise that the input to the map is the reaction force motor rotation angle θr, the angle reference reaction torque calculation unit 321 calculate an angle reference reaction torque command value Tr_c1 by using the map in the following way. When the braking force difference ΔBlr is zero, that is, when the high turning control is not performed, the angle reference reaction torque calculation unit 321 uses the map shown as the solid line to calculate an angle reference reaction torque command value Tr_c1. When the braking force difference ΔBlr is larger than zero, that is, when the high turning control is being performed, the angle reference reaction torque calculation unit 321 uses the map shown as the dashed line to calculate an angle reference reaction torque command value Tr_c1*, as illustrated in FIG. 10, On the premise that the input to the map is the reaction force motor angular speed ωr, the angular speed reference reaction torque calculation unit 322 calculate an angular speed reference reaction torque command value Tr_c2* by using the map in the following way. When the braking force difference ΔBlr is zero, that is, when the high turning control is not being performed, the angular speed reference reaction torque calculation unit 322 uses the map shown as the solid line to calculate the angular speed reference reaction torque command value Tr_c2*. When the braking force difference ΔBlr is larger than zero, that is, when the high turning control is being performed, the angular speed reference reaction torque calculation unit 322 uses the map shown as the dashed line to calculate the angular speed reference reaction torque command value Tr_c2*. The adder 323 adds the angle reference reaction torque command value Tr_c1* and the angular speed reference reaction torque command value Tr_c2* to calculate the application reaction torque command value Tr_c*. Accordingly, when the high turning control is being performed, the steering wheel 91 is harder to rotate than when the high turning control is not being performed.

In the above, the basic reaction force calculation unit 15, the angle reference reaction torque calculation unit 321, and the angular speed reference reaction torque calculation unit 322 use the same maps. Alternatively, the different maps may be provided for different calculation units 15, 321 and 322. Additionally, in place of using the maps to calculate their outputs, the calculation units 15, 321 and 322 may switch gains depending on the braking force difference ΔBlr. Moreover, instead of depending on the braking force difference ΔBlr, the calculation units 15, 321 and 322 may switch the maps or the gains depending on the reaction force motor rotation angle θr.

In the steer-by-wire system 90 where the steering member 91 and the steered wheel 901 are mechanically separated from each other, the basic reaction force and the applied reaction torque are settable independently, unlike the case where they are mechanically coupled to each other. For example, in the steer-by-wire system 90, it is possible to increase the applied reaction torque while keeping the basic reaction force approximately constant. Therefore, in the steer-by-wire system 90, it is easier to provide the driver with states of the turning and braking cooperative operation, as compared with the system where a steering member and a steered wheel 901 are mechanically coupled to each other.

In the embodiment, the reaction force device 400 includes the reaction force motor 480. The reaction force controller 12 includes the reaction force generation control unit 32. The reaction force generation control unit 32 calculates the application reaction torque command value Tr_c* based on at least one of: the reaction force motor rotation angle θr, which is a rotation angle of the reaction force motor 480; and the reaction force motor angular speed ωr, which is a rotation speed of the reaction force motor 480. The reaction force generation control unit 32 provides calculation results by using different calculation ways, so that when high turning control is being performed, the application reaction torque command value Tr_c* is larger than when the high turning control is not performed.

Figure 11:
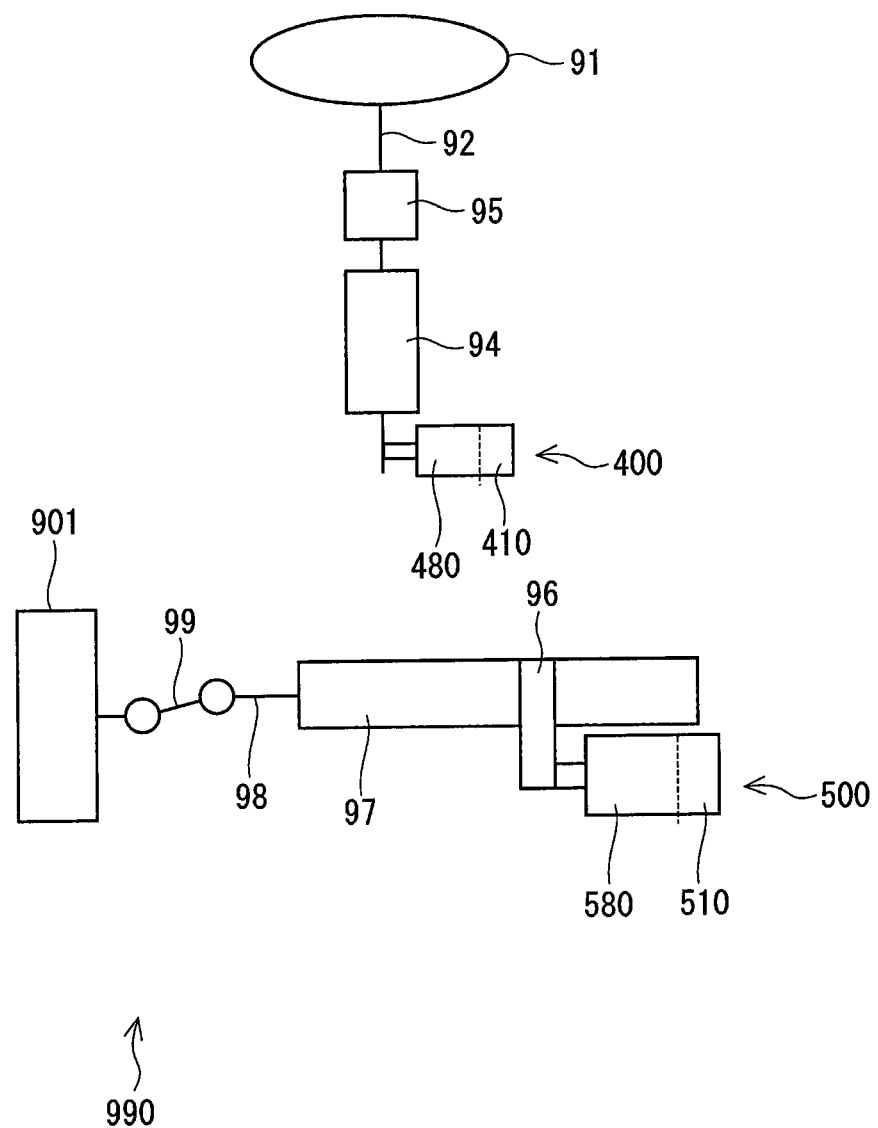
FIG. 11 is a diagram schematically illustrating a steer-by-wire system according to a third embodiment.

The turning device 500 includes the turning motor 580. The reaction force controller 12 includes the basic reaction force calculation unit 15. The basic reaction force calculation unit 15 calculates the basic reaction torque command value Tr_b* based on the turning torque Tt where the turning torque Tt is torque of the turning motor 580. The basic reaction force calculation unit 15 provides calculation results by using different calculation ways, so that when high turning control is being performed, the basic reaction torque command value Tr_b* is larger than when the high turning control is not being performed. Accordingly, the reaction force is adequately controllable. In the above, the different calculation ways correspond to the switching of maps and/or gains depending on whether the high turning control is being performed Third Embodiment A third embodiment will be described with reference to FIG. 11 and FIG. 12. A steer-by-wire system 990 according to the embodiment further includes a force sensor 95 as compared with the steer-by-wire system 90 according to the first embodiment. The force sensor 95 detects a force F applied in left and right directions of the steering shaft 92 by the driver. In the embodiment, the force detected by the force sensor 95 may be a force applied in upper and lower directions other than rotation direction (i.e., other than a steering direction of the steering wheel 91). Alternatively, the force detected by the force sensor 95 may be a force in directions to push or pull the steering wheel 91.

Figure 12:
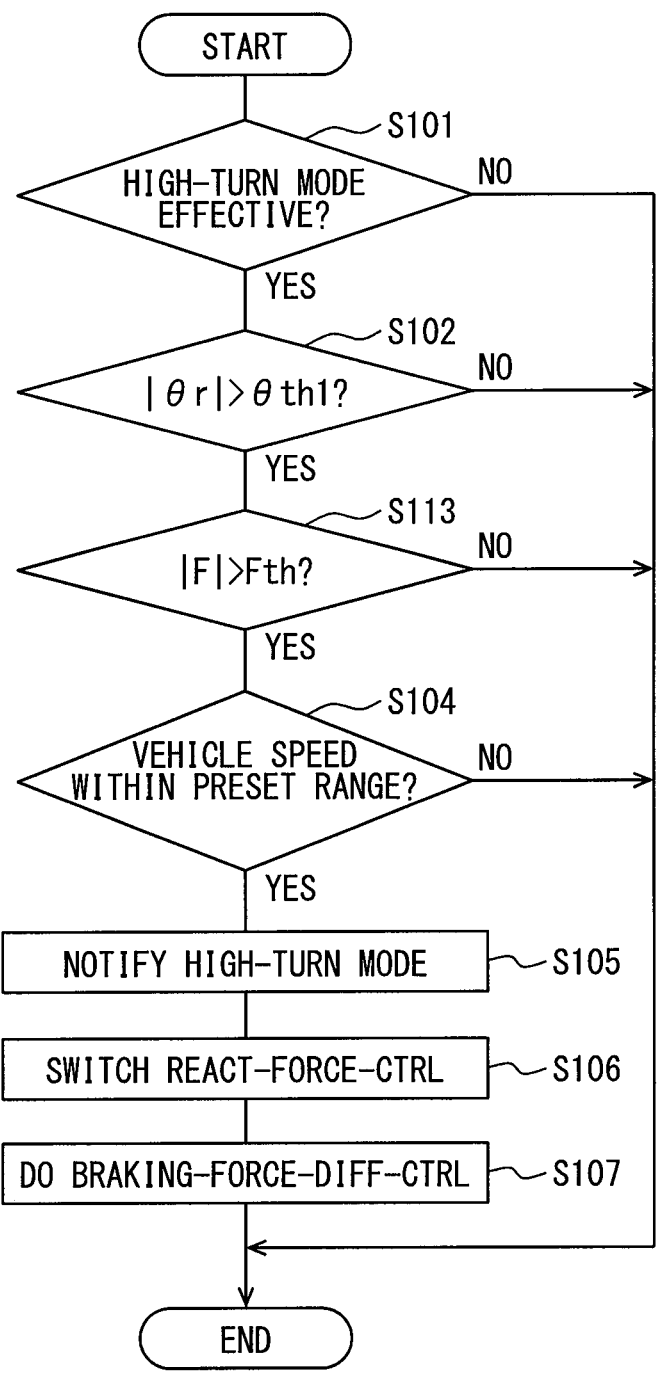
FIG. 12 is a flowchart illustrating turning control processing according to the third embodiment.

FIG. 12 illustrates turning control processing. The turning control processing in FIG. 12 differs from that in FIG. 8 in that the turning control processing in FIG. 12 includes S113 as an alternative to S103 in FIG. 8.

In S113, the reaction force controller 11 judges whether an absolute value |F| of the force detected by the force sensor 95 is larger than a force judgment threshold Fth (e.g., 5[N]). The force judgment threshold Fth is set to a value that enables to judge that the user's intention is the high turning. When it is judged that the absolute value |F| of the force is less than or equal to the force judgment threshold Fth (NO in S113), the subsequent processing is not performed. When it is judged that the absolute value |F| of the force is larger than the force judgment threshold Fth (YES in S113), the processing proceeds to S104. When the judgment in S104 is affirmative, the high turning control is performed.

In the embodiment, the steer-by-wire system 990 includes the force sensor 95 for detecting a force applied in a direction different from the steering direction of the steering wheel 91. When the absolute value |F| of the detection value of the force sensor 95 is larger than the force judgment threshold Fth (YES in S113), the high turning control is allowed to be implemented. Because the high turning using the braking force difference is implemented when the force in a direction different from normal rotation direction is detected, the user can easily recognize that the control is switched.

Fourth Embodiment

Figure 13:
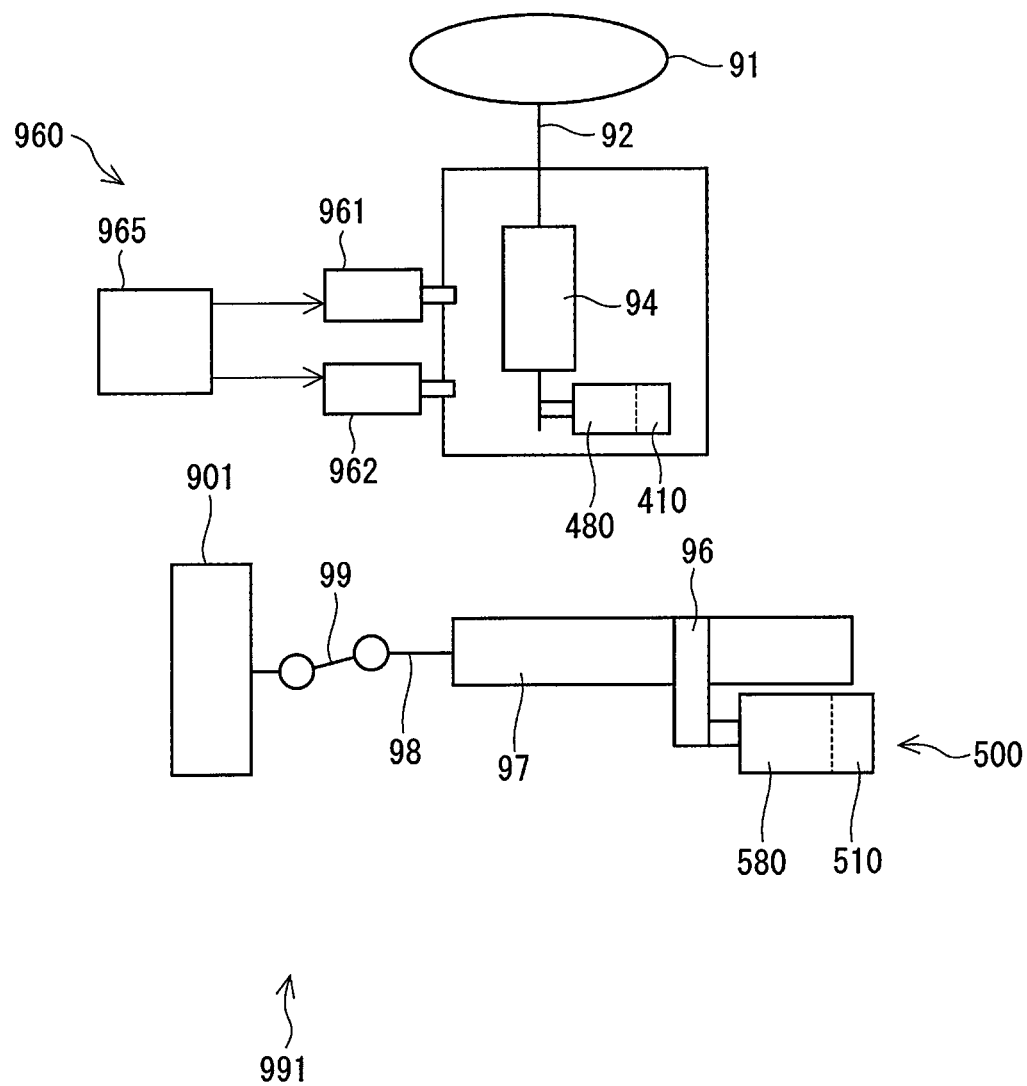
FIG. 13 is a diagram illustrating a steer-by-wire system according to a fourth embodiment.

A fourth embodiment will be described with reference to FIG. 13 and FIG. 14. A steer-by-wire system 991 according to the present embodiment further includes a tilt and telescopic mechanism 960, as compared with the steer-by-wire system 90 according to the first embodiment. The tilt and telescopic mechanism 960 includes a tilt actuator 961, a telescopic motor 962, a tilt-telescopic control unit 965, and the like. The tilt actuator 961 is used to adjust a tilt angle θti, and the telescopic motor 962 is used to adjust a telescopic mechanism. In the embodiment, the tilt actuator 961 and the telescopic motor 962 are a motor with brush.

Figure 14:
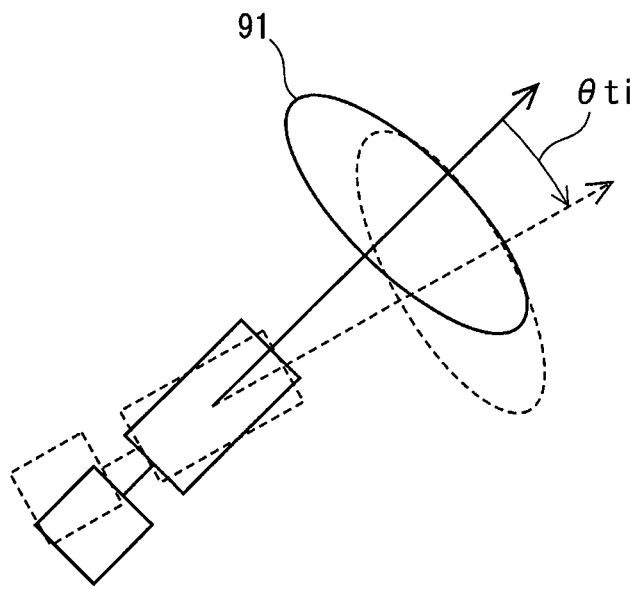
FIG. 14 is a diagram schematically illustrating a tilt angle according to the fourth embodiment.
Figure 15:
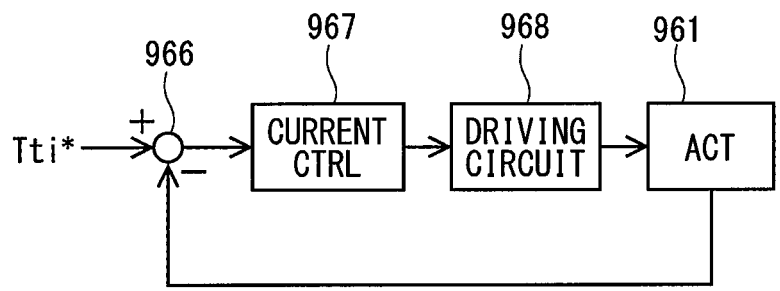
FIG. 15 is a block diagram illustrating a tilt-telescopic control unit according to the fourth embodiment.

As illustrated in FIG. 14, the tilt angle θti is an amount of change from an initial angle θinit determined by a tilt angle adjustment switch, and is detected by, for example, a tilt angle sensor not shown. As illustrated in FIG. 15, the tilt-telescopic control unit 965 includes a subtractor 966, a current control unit 967, and the like. The subtractor 966 calculates a torque deviation by subtracting a torque fed back from the tilt actuator 961 from a tilt torque command value Tt1*, where the tilt torque command value Tt1* is a converted value based on the tilt angle θti using Formula (2). The current control unit 967 performs current control and generates a driving signal so that the torque deviation converges to zero. By controlling the on state and off state of switching elements constituting a driving circuit 968 based on the generated driving signal, driving of the tilt actuator 961 is controlled.

$$Tti^* = |K \times \theta ti| \qquad (2)$$

When the high turning mode is off, a gain K is a sufficiently large value. In this case, the tilt actuator 961 outputs such torque that the tilt angle θti is unchangeable by the drive's operation to the steering wheel 91. When the high turning mode is on, the gain K is a smaller value than that when the high turning mode is off. In this case, the tilt actuator 961 outputs such torque that the tilt angle θti is changeable by the drive's operation to the steering wheel 91 and that the output torque is larger as the tilt angle θti is larger.

Figure 16:
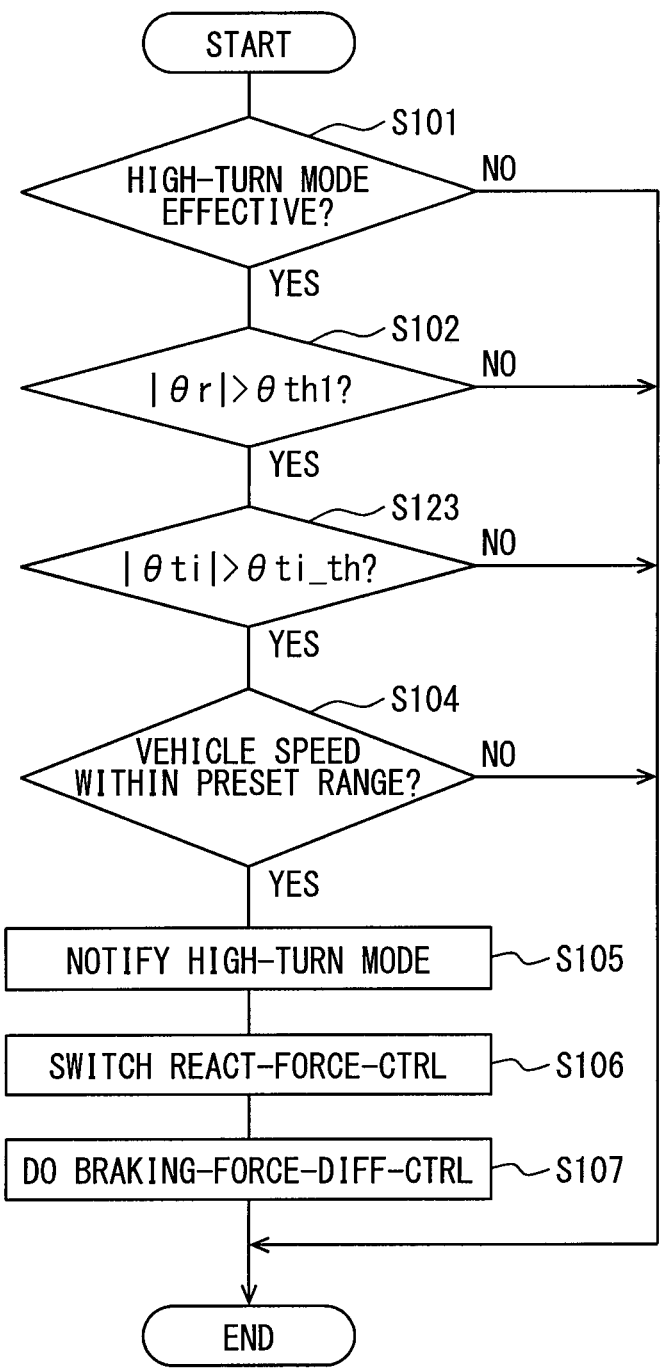
FIG. 16 is a flowchart illustrating turning control processing according to the fourth embodiment.

The turning control processing will be described with reference to FIG. 16. The turning control processing in FIG. 16 differs from that illustrated in FIG. 8 that the turning control processing in FIG. 16 includes S123 as an alternative to S103 in FIG. 8. In S123, the reaction force controller 11 judges whether the absolute value |θti| of tilt angle is larger than a tilt angle judgment threshold θti_th (e.g., 15 degrees). The tilt angle judgment threshold θti_th is set to such a value that it is determinable that the user's intention is the high turning. When it is judged that the absolute value Mil of tilt angle is less than or equal to the tilt angle judgment threshold θti_th (NO in S123), the subsequent processing is not performed. When it is judged that the absolute value |θti| of tilt angle is larger than the tilt angle judgment threshold θti_th (YES in S123), the processing proceeds to S104. When a result of the judgment in S104 is affirmative, the high turning control is implemented.

The steer-by-wire system 991 further includes the tilt and telescopic mechanism 960 having the tilt actuator 961 capable of changing a position of the steering wheel 91. In the embodiment, the tilt actuator 961 corresponds to an actuator. Whether it is judged whether the high turning control is allowed, based on a driving state of the tilt and telescopic mechanism 960 (S123). In the embodiment, the tilt angle θti corresponds to a driving state of the tilt and telescopic mechanism. The present embodiment having the above configuration also provides substantially the same advantages as the first to third embodiments, in particular the third embodiment.

Other Embodiments

In the above embodiments, a steering angle corresponding value is the reaction force motor rotation angle. When the reaction force motor rotation angle is larger than the first threshold, the high turning control using the braking force difference is performed. However, the steering angle corresponding value is not limited to the reaction force motor rotation angle. In other embodiments, and any value such as turning angle may be employed as the steering angle corresponding value as long as it is convertible into the steering angle. Alternatively, the steering angle corresponding value may be steering angle itself.

In other embodiments, each of the calculations relating to the high turning control may be performed by any of the reaction force controller, the turning controller, and the brake control unit. For example, the braking force difference may be calculated by the brake control unit. Specifically, although the reaction force control unit functions as a turning control device in the above embodiments, the turning control device may implemented by one or some or all of the reaction force controller, the turning controller, the brake control unit and other control devices in other embodiments.

In the above embodiments, the high turning control is performed such that the left and right front wheels acting as the steered wheels have the braking force difference.

In other embodiments, the high turning control may be performed such that the front and rear wheels have the braking force difference and/or the left and right rear wheels have the braking force difference.

The second embodiment calculates the basic reaction torque command value, the angle reference reaction torque command value and the angular speed reference reaction torque command value. When calculating each of these, the second embodiment uses the different maps depending on whether the high turning control is being performed or the high turning control is not being performed. In other words, the second embodiment employs different calculation manners depending on whether or not the high turning control is being performed.

Alternatively, when calculating at least one of the basic reaction torque command value, the angle reference reaction force command value, and the angular speed reference reaction torque command value, another embodiment may use the same map regardless of whether or not the high turning control is being performed. In other words, the another embodiment employs the same calculation manner regardless of whether or not the high turning control is being performed.

The fourth embodiment may be configured to judge whether to perform the high turning control, based the tilt angle. Another embodiment may be configured to judge whether to perform the high turning control, based on at least a driving state of the tilt and telescopic mechanism in place of the tilt angle. The driving state of the tilt and telescopic mechanism include at values used in place of the title angle include one or some or all of the rotation angle of the tilt actuator, the rotation angle of the telescopic motor, the stroke of the telescopic mechanism.

To judge whether to perform the high turning control, the third embodiment uses the result of the force sensor in place of the steering torque and the fourth embodiment uses the tilt angle in place of the steering torque.

Another embodiment may judge whether to perform the high turning control, based on a combination of the steering torque, the result of the force sensor and the driving state of the tilt and telescopic mechanism. The order of S101 to S104 in FIG. 8 may be changed. Some of S101 to S104 may be omitted. The same is applicable to FIG. 12 and FIG. 16.

In the above embodiments, the high turning control implementation judge unit 41 judges whether the high turning mode is effective in S101. In the above embodiments, the judgment in S101 is made based on the presence or absence of the user's operation to the particular switch, which switch is used for the user to set whether the high turning mode is effective or not. Additionally or alternatively, it may be judged that the high turning mode is effective, when a gear shift lever is in a reverse position.

In the above embodiments, the high turning control is performed on a condition that the vehicle speed is in a preset range. Alternatively, the following configuration may be used. The vehicle speed may be limited during the high turning control. Once the vehicle speed becomes zero, the high turning control may be performed with the limitation on the vehicle speed. When the vehicle speed becomes zero again, the high turning control may be ended and the limitation on the vehicle speed may be ended.

In the above embodiments, the reaction force motor and the turning motor are 3-phase brushless motors, and the tilt actuator and the telescopic motor are motors with brush. In other embodiments, the reaction force motor, the turning motor, the tilt actuator, and the telescopic motor may be any motor.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A turning control device provided in a vehicle control system,
the vehicle control system including:
a steer-by-wire system in which a steering member and a steered wheel are mechanically separated from each other, the steer-by-wire system including
a turning device configured to generate torque for turning the steered wheel in accordance with a steering state of the steering member and
a reaction force device configured to apply a reaction force to the steering member; and a brake system capable of controlling braking forces of left and right tire wheels independently from each other, the turning control device comprising:

one or more microcomputers configured to act as a braking difference calculation unit that calculates a braking force difference, which is a difference in braking force between the left and right tire wheels, wherein the one or more microcomputers is further configured to perform a high turning control that generates the braking force difference to the left and right tire wheels to cause a turning radius of a vehicle equipped with the steer-by-wire system to be smaller when a steering angle corresponding value is larger than a judgment threshold, thereby the turning radius when the high turning control is performed is smaller than the turning radius when the high turning control is not performed, and wherein the steering angle corresponding value is a steering angle or an absolute value of a value convertible into the steering angle.

2. The turning control device according to claim 1, wherein:

the one or more microcomputers is further configured to control the reaction force applied to the steering member such that when the high turning control is being performed, the reaction force applied to the steering member is larger than when the high turning control is not being performed.

3. The turning control device according to claim 2, wherein:

the judgment threshold is a first judgment threshold;

a second judgment threshold is set to be larger than the first judgment threshold; and the one or more microcomputers is further configured to control the reaction force such that: when the steering angle corresponding value is larger than the second judgment threshold, the reaction force applied to the steering member is larger than when the steering angle corresponding value is less than or equal to the second judgment threshold.

4. The turning control device according to claim 3, wherein:

the second judgment threshold is set depending on a limit of turning by the braking force difference.

5. The turning control device according to claim 1, wherein:

the judgment threshold is set depending on a maximum angle of turning by the turning device.

6. The turning control device according to claim 1, wherein:

the reaction force device includes a reaction force motor;

the one or more microcomputers is further configured to act as a reaction force generation control unit that calculates an application reaction torque command value based on at least one of a rotation angle of the reaction force motor and a rotation speed of the reaction force motor; and the reaction force generation control unit employs different calculation manners to calculate the application reaction torque command value so that when the high turning control is being performed, the application reaction torque command value is larger than when the high turning control is not being performed.

7. The turning control device according to claim 1, wherein:

the turning device includes a turning motor;

the one or more microcomputers is further configured to act as a basic reaction force calculation unit that calculates a basic reaction torque command value based on a turning torque being a torque of the turning motor; and the basic reaction force calculation unit employs different calculation manners to calculate the basic reaction torque command value so that when the high turning control is being performed, the basic reaction torque command value is larger than when the high turning control is not being performed.

8. The turning control device according to claim 1, wherein:

the one or more microcomputers is further configured to allow the high turning control to be implemented when an absolute value of steering torque input by a driver is larger than a steering torque judgment threshold.

9. The turning control device according to claim 1, wherein:

the one or more microcomputers is further configured to allow the high turning control to be implemented when a vehicle speed is within a preset range.

10. The turning control device according to claim 1, wherein:

the steer-by-wire system further includes a force sensor that detects a force applied in a direction different from a steering direction of the steering member; and the one or more microcomputers is further configured to allow the high turning control to be implemented when an absolute value of a detection value of the force sensor is larger than a force judgment threshold.

11. The turning control device according to claim 1, wherein:

the steer-by-wire system further includes a tilt and telescopic mechanism with an actuator configured to change a position of the steering member; and the one or more microcomputers is further configured to judge whether to allow the high turning control to be performed, based on a driving state of the tilt and telescopic mechanism.

* * * * *